(12) United States Patent
Zheng et al.

(10) Patent No.: US 11,329,311 B2
(45) Date of Patent: May 10, 2022

(54) LITHIUM BATTERY USING LITHIUM POLYSULFIDE AS THE CATHODE ACTIVE MATERIAL

(71) Applicant: FLORIDA STATE UNIVERSITY RESEARCH FOUNDATION, INC., Tallahassee, FL (US)

(72) Inventors: Jian-ping Zheng, Tallahassee, FL (US); Chao Shen, Tallahassee, FL (US)

(73) Assignee: FLORIDA STATE UNIVERSITY RESEARCH FOUNDATION, INC., Tallahassee, FL (US)

(*) Notice: Subject to any disclaimer, the term of this patent is extended or adjusted under 35 U.S.C. 154(b) by 0 days.

(21) Appl. No.: 16/194,572

(22) Filed: Nov. 19, 2018

(65) Prior Publication Data
US 2019/0229366 A1    Jul. 25, 2019

Related U.S. Application Data

(60) Provisional application No. 62/619,199, filed on Jan. 19, 2018.

(51) Int. Cl.
| | |
|---|---|
| *H01M 10/052* | (2010.01) |
| *H01M 4/38* | (2006.01) |
| *H01M 4/62* | (2006.01) |
| *H01M 10/058* | (2010.01) |
| *H01M 4/58* | (2010.01) |
| *H01M 10/0566* | (2010.01) |

(52) U.S. Cl.
CPC ......... *H01M 10/052* (2013.01); *H01M 4/382* (2013.01); *H01M 4/5815* (2013.01); *H01M 4/625* (2013.01); *H01M 10/058* (2013.01); *H01M 10/0566* (2013.01)

(58) Field of Classification Search
None
See application file for complete search history.

(56) References Cited

U.S. PATENT DOCUMENTS

| 6,376,123 B1 | 4/2002 | Chu |
| 2006/0194115 A1 | 8/2006 | De Jonghe et al. |
| 2011/0006738 A1* | 1/2011 | Mikhaylik ............ H01M 4/134 320/134 |
| 2014/0017569 A1* | 1/2014 | Wang .................... H01M 4/133 429/231.8 |
| 2014/0050973 A1* | 2/2014 | Manthiram ......... H01M 2/1646 429/188 |
| 2014/0342209 A1* | 11/2014 | He ........................ H01M 4/663 429/101 |
| 2015/0056493 A1* | 2/2015 | Dadheech ........... C23C 14/0605 429/145 |
| 2017/0207484 A1 | 7/2017 | Zhamu et al. |

OTHER PUBLICATIONS

Andrei et al.: "Theoretical and experimental analysis of precipitation and solubility effects in lithium-sulfur batteries", ElectrochimicaActa 284 (2018) 469-484.
Shen et al.: "Communication-Effect of Lithium Polysulfide Solubility on Capacity of Lithium-Sulfur Cells", Journal of The Electrochemical Society, 164 (6) A1220-A1222 (2017).
Maihon et al.: "Lithium Bond Impact on Lithium Polysulfide Adsorption with Functionalized Carbon Fiber Paper Interlayers for Lithium-Sulfur Batteries", J. Phys. Chem. C, 2018, 122 (13), pp. 7033-7040.
Z. Meng et al.:, "Graphene-like g-C3N4 nanosheets/sulfur as cathode for lithium-sulfur battery", Electochim. Acta, 210 (2016) 829-836.
International Search Report dated Jul. 29, 2019 in International Application No. PCT/US18/61732.

* cited by examiner

*Primary Examiner* — Robert S Carrico
(74) *Attorney, Agent, or Firm* — Fox Rothschild LLP

(57) ABSTRACT

A lithium-sulfur battery comprises a cathode electrode comprising from 80% to 100% lithium polysulfide based on the total weight of sulfur adsorbed at the cathode when the lithium sulfur battery is fully charged, and a high specific surface area electrically conductive material. An anode electrode comprises lithium. A porous and electrically insulating membrane is provided between the cathode and the anode electrodes. An electrolyte is adsorbed into and between cathode electrode, the anode electrode, and the membrane. A cathode current collector is electrically connected to the cathode and an anode current collector is electrically connected to the anode. A porous and electrically conductive interlayer can be provided between the membrane and at least one selected from the group consisting of the cathode and the anode. A method of making a battery is also disclosed.

14 Claims, 13 Drawing Sheets

LITHIUM BATTERY USING LITHIUM POLYSULFIDE AS THE CATHODE ACTIVE MATERIAL

CROSS-REFERENCE TO RELATED APPLICATIONS

This application claims priority to U.S. provisional patent application No. 62/619,199 filed on Jan. 19, 2018, entitled "Lithium-Li$_2$S$_4$ batteries using lithium polysulfide as the cathode active material", the entire disclosure of which is incorporated herein by reference.

STATEMENT REGARDING FEDERALLY SPONSORED RESEARCH AND DEVELOPMENT

This invention was made with government support under Contract No. 035739 awarded by the U.S. Army Communications-Electronics Research, Development and Engineering Center. The government has certain rights in this invention.

FIELD OF THE INVENTION

The present invention relates lithium batteries, and more particularly to lithium sulfur batteries and methods of making lithium sulfur batteries.

BACKGROUND OF THE INVENTION

The demand for renewable energy to replace fossil fuel has increased globally. Energy storage technologies are playing an increasingly important role for both the effective utilization of renewable energy sources and for the design of an electrified road transportation system. High energy density rechargeable batteries are the critical elements in the cutting-edge energy storage technologies. Conventional lithium ion batteries (LIBs) have dominated the portable electronic devices market for more than thirty years. However, as the energy density of LIBs is approaching their theoretical limits, an alternative battery chemistry to transform the current energy landscape is currently highly needed.

The use of lithium-sulfur (Li—S) batteries, normally comprised of a sulfur cathode and a lithium anode, can provide a theoretical specific energy considerably higher than that of LIBs. Both sulfur and lithium are lightweight elements with theoretical specific capacities of 1,672 and 3,860 mAh g$^{-1}$, respectively. Considering an average voltage of 2.15 V, the theoretical specific energy of such a battery is 2,500 Wh kg$^{-1}$ based on the mass of active materials.

Other than the practical limits impeding the commercialization of Li—S batteries, there is also doubt about the theoretical specific energy of these batteries. It has been generally accepted that in the scope of the whole device, instead of materials only, battery parameters, such as the weight percentage of sulfur in the cathode (or C/S ratio), the excess mass of lithium, and the electrolyte/sulfur (E/S in ml g$^{-1}$) ratio have profound influence on the specific energy of Li—S batteries. Among these the E/S ratio has the most significant effect. In order to increase the energy density of rechargeable Li—S batteries, the E/S ratio should be decreased as much as possible. Despite recent improvements in electrode and electrolyte design, most of the Li—S batteries presented in the literature continue to use a large amount of electrolyte and the reported energy densities are much below the maximum theoretical limit.

There are multiple reasons for using a large amount of electrolyte in Li—S batteries. First, most reported Li—S batteries contain enough electrolyte to fully dissolve the intermediate LiPS products. Also, additional electrolyte is needed to avoid problems related to severe performance degradation at low E/S ratios and electrolyte consumption from side reactions. Finally, the solid electrolyte interphase (SEI) formed on the anode side was found to lead to gradual etching of Li metal at high LiPS concentrations. This effect is usually alleviated by adding extra electrolyte in the cell. However, from the point view of specific energy, if the E/S ratio is larger than 4.8 ml g$^{-1}$, then the specific energy of Li—S batteries cannot reach 500 Wh kg$^{-1}$. Therefore, achieving reversible electrochemistry under low E/S ratio conditions is necessary for the successful commercialization of high energy density Li—S systems.

When operated under the lean electrolyte condition, the effect of lithium polysulfide (LiPS) solubility cannot be overlooked. It is well known that the upper plateau in the voltage profile of Li—S batteries involves the reduction of elemental sulfur to high-order LiPS or Li$_2$S$_n$ (6<n≤8), and its further conversion to low-order LiPS or Li$_2$S$_n$ (2<n≤6). When a large amount of electrolyte is used, the solubility of LiPS is not reached and therefore all the intermediate LiPS exists in liquid phase. However, at low E/S ratio the LiPS concentration could go beyond the solubility limit. For instance, in the widely used 1,2-dimethoxyethane (DME): 1,3-dioxolane (DOL) binary electrolyte ([S]=~6 M), the minimum E/S ratio that enables the full dissolution of LiPS is 5.2 mL g$^{-1}$. Therefore, the high energy density Li—S batteries are expected to be operated under a lean electrolyte condition with saturated intermediate LiPS.

In conventional Li—S batteries, the sulfur source exists solely as elemental sulfur or Li$_2$S in solid phase, or LiPS in liquid phase. However, under these conditions the saturation of LiPS can be hardly obtained. Starting as elemental sulfur, the reactions usually become too sluggish to fully utilize the entire active material and as a result the concentration of LiPS is still below the solubility limit. Starting as LiPS(l), the prepared LiPS solution concentration is always below the saturation level, and starting as Li$_2$S, the slow kinetics and the high activation energy caused by the electrically and ionically-insulating nature of Li$_2$S would hinder its full oxidation during the initial charge process. An alternative cathode which induces high reaction kinetics and which can be operated beyond LiPS solubility limits has yet to be demonstrated.

SUMMARY OF THE INVENTION

A lithium-sulfur battery can include a cathode electrode comprising from 80% to 100% lithium polysulfide based on the total weight of sulfur adsorbed at the cathode when the lithium sulfur battery is fully charged, and a high specific surface area electrically conductive material. An anode electrode can include lithium. A porous and electrically insulating membrane can be provided between the cathode and the anode electrodes. An electrolyte can be adsorbed into and between the cathode electrode, the anode electrode, and the membrane. A cathode current collector and an anode current collector can also be provided.

The lithium polysulfide can be at least one selected from the group consisting of Li$_2$S$_4$, Li$_2$S$_6$, and Li$_2$S$_8$. The lithium polysulfide can be Li$_2$S$_4$.

The weight ratio of $Li_2S_4$ and high specific surface area electrically conductive material can be within a range of 1:5 to 10:1. The ratio of electrolyte volume to the weight of $Li_2S_4$ can be less than 10 mL electrolyte to 1 g $Li_2S_4$. The ratio of electrolyte volume to the weight of lithium polysulfide $Li_2S_4$ can be 1-10 mL electrolyte to 1 g $Li_2S_4$. The ratio of $Li_2S_4$ in the cathode to lithium in the anode can be between 3.4 to 1.7 by weight or between 1/6 to 1/12 by mole.

The high specific surface area electrically conductive material can be at least one selected from the group consisting of carbon nanotube, graphene, activated carbon, graphite, carbon black, carbon micro bead, hard carbon, and soft carbon. The high specific surface area electrically conductive material can be nitrogen doped, nitrogen comprising up to 40% by weight based on the total weight of the cathode.

The specific surface area of the high specific surface area electrically conductive material can be greater than 50 $m^2/g$ to 1,000 $m^2/g$. The electrical conductivity of the high specific surface/electrical conductive material can be greater than 1 S/cm.

The electrolyte can include lithium salts and organic solvent. The lithium salt can include at least one selected from the group consisting of (trifluoromethanesulfonyl)imide (LiTFSI), lithium bis(fluorosulfonyl)imide (LiFSI), lithium oxalyldifluoroborate (LiODFB), lithium bis(oxalato)borate (LiBOB), fluoroalkylphosphate (LiFAP), lithium difluoro(oxalato)borate (LiDFOB), $LiPF_6$, $LiBF_4$, $LiClO_4$, $LiClO_4$, $LiNO_3$, $Li_2S_4$, $Li_2S_6$, and $Li_2S_8$. The solvent can include at least one selected from the group consisting of 1,3-dioxolane (DOL), 1,2-dimethoxy ethane (DME), tri(ethylene glycol) dimethyl ether (triglyme, G3), tetra(ethylene glycol) dimethyl ether (TEGDME, tetraglyme, G4), and tetrahydrofuran (THF).

The cathode current collector can include aluminum. The anode current collector can include copper.

A lithium-sulfur battery can include a cathode electrode with a mixture of from 80% to 100% $Li_2S_4$ based on the total weight of sulfur adsorbed at the cathode when the lithium sulfur battery is fully charged, and high specific surface area electrically conductive material. An anode electrode can include lithium. A porous and electrically insulating membrane can be provided between the cathode and anode electrodes. An electrolyte can be adsorbed into and between the cathode electrode, the anode electrode, and the membrane. A porous and electrically conductive interlayer can be provided between the membrane and at least one selected from the group consisting of the cathode electrode and the anode electrode. A cathode current collector and an anode current collector can be provided.

The lithium polysulfide can include $Li_2S_4$, and the ratio of $Li_2S_4$ in the cathode to lithium in the anode is between 3.4 to 1.7 by weight or between 1/6 to 1/12 by mole. The ratio between lithium polysulfide in the cathode and lithium in the anode can be between 2.8 to 1.4 by weight or 1/14 to 1/28 by mole.

A method of making a battery can include the steps of providing a mixture of from 80% to 100% lithium polysulfide based on the total weight of sulfur adsorbed at the cathode when the lithium sulfur battery is fully charged, and a high specific surface area electrically conductive material, providing an anode electrode comprising lithium, and providing a porous and electrically insulating membrane between the cathode and the anode electrodes. The method can further include the step of electrically connecting the cathode electrode to a cathode current collector and the anode electrode to an anode current collector. An electrolyte is applied such that the electrolyte is between and adsorbed into the cathode electrode, the anode electrode, and the membrane.

The ratio between lithium polysulfide in the cathode and lithium in the anode can be between 2.8 to 1.4 by weight or 1/14 to 1/28 by mole.

The method can further include the step of providing a porous and electrically conductive interlayer between the membrane and at least one selected from the group consisting of the cathode electrode and the anode electrode.

BRIEF DESCRIPTION OF THE DRAWINGS

There are shown in the drawings embodiments that are presently preferred it being understood that the invention is not limited to the arrangements and instrumentalities shown, wherein:

FIG. 6A shows the discharge profiles of the Li—S cell in different cycles. FIG. 6B shows the discharge profiles of the Li—$Li_2S_4$ cell in different cycles. FIG. 6C shows the cycling performance of the Li—S and Li—$Li_2S_4$ cells.

FIG. 12A is SEM image of the pristine CNT foam. FIG. 12B is a SEM image of the C/S cathode. FIG. 12C is a SEM image of the $C/Li_2S_{4(S)}$ cathode. FIG. 12D is EDS mapping of the SEM images shown in FIG. 12B and FIG. 12C.

DETAILED DESCRIPTION OF THE INVENTION

Figure 1A:
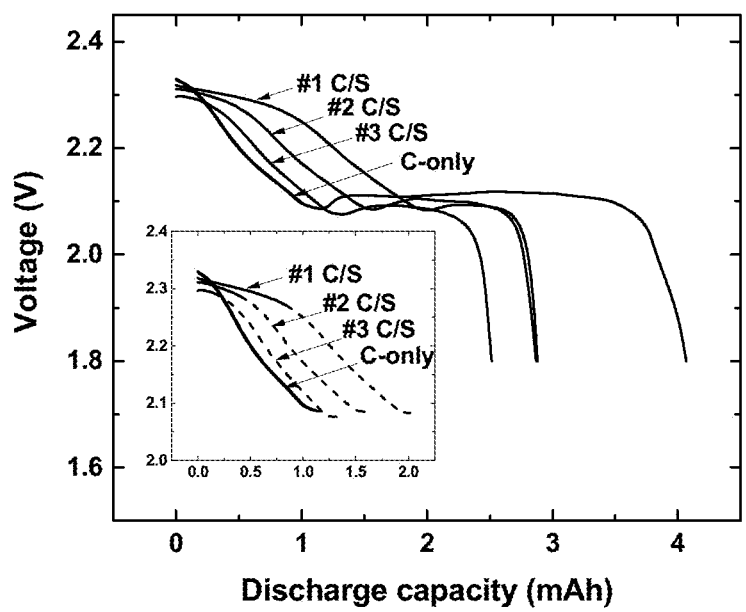
FIG. 1A shows the voltage profiles of Li—S cells with C/S cathodes and $Li_2S_8$ catholyte ([S]=5 M).

A lithium-sulfur battery comprises a cathode electrode comprising from 80% to 100% lithium polysulfide based on the total weight of sulfur adsorbed at the cathode when the lithium sulfur battery is fully charged, and a high specific surface area electrically conductive material. An anode electrode comprises lithium. A porous and electrically insulating membrane is provided between the cathode and the anode electrodes. An electrolyte is adsorbed into and between cathode electrode, the anode electrode, and the membrane. A cathode current collector is electrically connected to the cathode and an anode current collector is electrically connected to the anode.

The lithium polysulfide can be at least one selected from the group consisting of $Li_2S_4$, $Li_2S_6$, and $Li_2S_8$. The lithium polysulfide can be $Li_2S_4$. Conventional lithium-sulfur batteries use sulfur as a cathode. During battery discharge, the reaction pathways in the cathode involve series reductions from sulfur to lithium polysulfide (LiPS) in liquid ($Li_2S_8$, $Li_2S_6$, and $Li_2S_4$) and solid ($Li_2S_2$) phases, then finally to solid lithium sulfide ($Li_2S$). The operation of Li—S batteries under lean electrolyte conditions can be challenging, because the solubility of high-order LiPS sets an upper bound for polysulfide dissolution and limits the maximum amount of sulfur in cathode to be reduced. However, when the cathode starts with solid $Li_2S_4$ which is the end of series of soluble LiPS, the solid $Li_2S_4$ will continue to dissolve with liquid $Li_2S_4$ reduced to solid $Li_2S_2$ and/or $Li_2S$ during the discharge process, and all the $Li_2S_4$ will be able to be reduced to the final product of $Li_2S$.

The weight ratio of $Li_2S_4$ and high specific surface area electrically conductive material can be within a range of 1:5 to 10:1. The weight ratio of $Li_2S_4$ and high specific surface area electrically conductive material can be 1:5, 2:5, 3:5, 4:5, 1:1, 2:1, 3:1, 4:1, 5:1, 6:1, 7:1, 8:1, 9:1, and 10:1, or within a range of any high and low value selected from these values. The cathode electrode can comprise 80, 81, 82, 83, 84, 85, 86, 87, 88, 89, 90, 91, 92, 93, 94, 95, 96, 97, 98, 99 or 100% lithium polysulfide based on the total weight of sulfur adsorbed at the cathode when the lithium sulfur battery is fully charged, or within a range of any high and low value selected from these values. The ratio of electrolyte volume to the weight of $Li_2S_4$ can be less than 10 mL electrolyte to 1 g $Li_2S_4$. The ratio of electrolyte volume to the weight of $Li_2S_4$ can be 10, 9, 8, 7, 6, 5, 4, 3, 2 or 1 mL electrolyte to 1 g $Li_2S_4$, or within a range of any high value and low value selected from these values. The ratio of electrolyte volume to the weight of lithium polysulfide $Li_2S_4$ can be 1, 2, 3, 4, 5, 6, 7, 8, 9, and 10 mL electrolyte to 1 g $Li_2S_4$, or within a range of any high and low value selected from these values. The ratio of $Li_2S_4$ in the cathode to lithium in the anode can be between 3.4 to 1.7 by weight or between 1/6 to 1/12 by mole. The ratio of $Li_2S_4$ in the cathode to lithium in the anode can be 1/6, 1/7, 1/8, 1/9, 1/10, 1/11, or 1/12 by mole, or within a range of any high value and low value selected from these values.

The high specific surface area electrically conductive material can be any suitable material with high specific surface area and which is electrically conductive. The specific surface area of the high specific surface area electrically conductive material can be greater than 50 $m^2/g$. The specific surface area of the high specific surface area electrically conductive material can be from 50 $m^2/g$ to 1,000 $m^2/g$. The specific surface area of the high specific surface area electrically conductive material can be 50, 100, 150, 200, 250, 300, 350, 400, 450, 500, 550, 600, 650, 700, 750, 800, 850, 900, 950, or 1,000 $m^2/g$, or within a range of any high and low value selected from these values. The electrical conductivity of the high specific surface/electrical conductive material can be greater than 1 S/cm. The high specific surface area electrically conductive material can be at least one selected from the group consisting of carbon nanotube, graphene, activated carbon, graphite, carbon black, carbon micro bead, hard carbon, and soft carbon. Other high specific surface area electrically conductive materials are possible.

The high specific surface area electrically conductive material can be nitrogen doped. Nitrogen can comprise up to 40% by weight based on the total weight of the cathode. Nitrogen can comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40% by weight based on the total weight of the cathode, or within a range of any high and low value selected from these values. Nitrogen doping can be accomplished using nitrogen-containing compounds such as melamine ($C_3H_6N_6$) and dicyandiamide ($C_2H_4N_4$).

The electrolyte can comprise suitable lithium salts and organic solvent. The lithium salt can comprise at least one selected from the group consisting of (trifluoromethanesulfonyl)imide (LiTFSI), lithium bis(fluorosulfonyl)imide (LiFSI), lithium oxalyldifluoroborate (LiODFB), lithium bis(oxalato)borate (LiBOB), fluoroalkylphosphate (LiFAP), lithium difluoro(oxalato)borate (LiDFOB), $LiPF_6$, $LiBF_4$, $LiClO_4$, $LiClO_4$, $LiNO_3$, $Li_2S_4$, $Li_2S_6$, and $Li_2S_8$. The solvent can comprise at least one selected from the group consisting of 1,3-dioxolane (DOL), 1,2-dimethoxy ethane (DME), tri(ethylene glycol) dimethyl ether (triglyme, G3), tetra(ethylene glycol) dimethyl ether (TEGDME, tetraglyme, G4), and tetrahydrofuran (THF).

A battery according to the invention can include suitable current collectors. The cathode current collector can comprise aluminum. The anode current collector can comprise copper. Other current collector materials are possible. The current collectors are electrically connected to the anode electrode and the cathode electrode by any suitable process.

A lithium-sulfur battery according to the invention can further include a porous and electrically conductive interlayer provided between the membrane and at least one selected from the group consisting of the cathode electrode and the anode electrode. The interlayer is an inserted freestanding film between the existing separator and electrode. Various functional nanomaterials and their composite materials have been examined in the form of the interlayers. The possible configurations include but not limit to carbon, polymer, and metal interlayers. The lithium polysulfide can be at least one selected from the group consisting of $Li_2S_4$, $Li_2S_6$, and $Li_2S_8$. The lithium polysulfide can be $Li_2S_4$, and the ratio of $Li_2S_4$ in the cathode to lithium in the anode is between 3.4 to 1.7 by weight or between 1/6 to 1/12 by mole. The ratio between lithium polysulfide in the cathode and lithium in the anode can be between 2.8 to 1.4 by weight or 1/14 to 1/28 by mole. The ratio should be irrelevant to the interlayer.

A method of making a battery can include the step of providing a mixture of from 80% to 100% lithium polysulfide based on the total weight of sulfur adsorbed at the cathode when the lithium sulfur battery is fully charged, and a high specific surface area electrically conductive material. An anode electrode comprising lithium is provided. A porous and electrically insulating membrane is provided between the cathode and the anode electrodes. The cathode electrode is electrically connected to a cathode current collector and the anode electrode is electrically connected to an anode current collector. An electrolyte is applied such that the electrolyte is adsorbed into and between the cathode electrode, the anode electrode, and the membrane.

The method can include the step of providing a porous and electrically conductive interlayer provided between the membrane and at least one selected from the group consisting of the cathode electrode and the anode electrode.

EXAMPLES

Example 1

The C/S cathodes were made by infiltrating sulfur into the CNT foams via the melting diffusion method. Sulfur powder was placed onto the surface of the CNT foam electrode uniformly and then heated and melted into the CNT foam with a hot plate set at 158° C. The electrode was rotated regularly during sulfur infiltration until designed loading was met. Three cathodes with different sulfur loadings were obtained for C/S cathodes. These cathodes contained approximately 4 mg, 2 mg, and 1 mg of sulfur, respectively and are denoted by #1, #2, and #3. The diameter of the cathodes was 12.7 mm. The carbon weight of the was 1.57 mg. The discharge performance of the cathodes described above was analyzed using $Li_2S_8$ catholyte, prepared by mixing stoichiometric amounts of sulfur and $Li_2S$ powders in a 0.5 M LiTFSI and 0.1 M $LiNO_3$ in DME:DOL (1:1 v:v) solution, which was then heated at 45° C. and stirred vigorously for 48 h in an argon-filled glovebox. The prepared cathode was assembled with a glass fiber separator (0.26 mm, GE healthcare) and a Li foil anode (0.25 mm, MTI) into a CR2032-type coin cell. 60 μL of desired electrolyte were used in all the cells. The assembled Li—S cells were discharged in galvanostatic mode under a current density of 0.4 mA $cm^{-2}$. The LSV measurements were made using a Gamry Instruments-Reference 3000 at a scan rate of 0.1 mV $s^{-1}$.

Figure 1B:
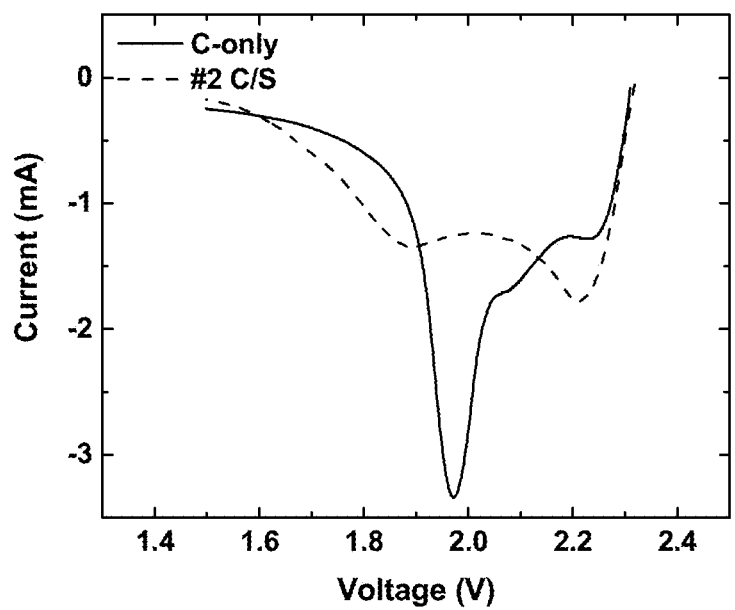
FIG. 1B shows the LSV curves of Li—S cells with C/S cathodes and $Li_2S_8$ catholyte ([S]=5 M).

FIG. 1A is voltage profiles of Li—S cells with C/S cathodes and $Li_2S_8$ catholyte ([S]=5 M). FIG. 1B is LSV curves of Li—S cells with C/S cathodes and $Li_2S_8$ catholyte ([S]=5 M). As seen in FIG. 1A, the capacities of the upper plateaus increase monotonically with the cathode sulfur loading. The upper plateaus can be further divided into two parts as seen in the lower-left inset. First, the relatively flat region at the beginning of the discharge (indicated by solid lines in FIG. 5A) is attributed to the reduction of sulfur to $Li_2S_8$. Note that the overall increase of the upper plateau capacity originates from this region. According to the capacities in this region, if the sulfur species of sample #1 C/S was dissolved in the electrolyte the total $Li_2S_8$ concentration would be [S]=~7 M, which is above the solubility limit. Therefore, it can be concluded that there exists a solid phase $Li_2S_8$. Second, the dashed oblique lines are associated with the conversion from high-order LiPS to low-order LiPS. The slopes and associated capacities are similar in this region.

These results imply that the reduction of sulfur to $Li_2S_8$ is not inhibited by the high concentration of the $Li_2S_8$ catholyte. However, the generated $Li_2S_8$ does not further convert to low-order LiPS, indicating that the active material is not used completely. This effect is most likely due to the fact that the electrolyte is saturated during the conversion from high-order LiPS to low-order LiPS and that LiPS has reached its solubility limit. The overall capacities of cells with C/S cathodes decreased compared to the capacity of the cell with carbon-only cathode. This decrease is due to the reduction of the lower plateau capacities (~2.9 mAh for C-only, ~0.9 mAh for #1 C/S, ~1.3 mAh for #2 C/S, and ~1.2 mAh for #3 C/S). The corresponding peak intensity of the sample #2 C/S cathode is significantly reduced compared to the C-only cathode, as shown by the LSV measurements presented in FIG. 1B.

The most common solvent is a mixture of DME and DOL (1:1 v:v), which is used in all the examples. The anode electrode can be lithium film or foil.

Example 2

The $C/Li_2S_8$ cathodes were made by loading CNT foam with solid-state LiPS. The selected LiPS species $Li_2S_8$ were prepared by mixing sulfur powder (Sigma-Aldrich) and $Li_2S$ powder (VWR) with a molar ratio of 7:1 in a DME (Sigma-Aldrich) solution. The precursor solution was heated at 45° C. and stirred vigorously for 48 h in an argon-filled glovebox (MBraun). After 48 h the sulfur powder reacted completely with $Li_2S$ to produce LiPS. The C/Li PS cathodes were obtained by soaking CNT foams in LiPS solution with controlled concentration and then dried overnight to evaporate the solvent. The cathodes were tested in the same way as described in Example 1.

Figure 2A:
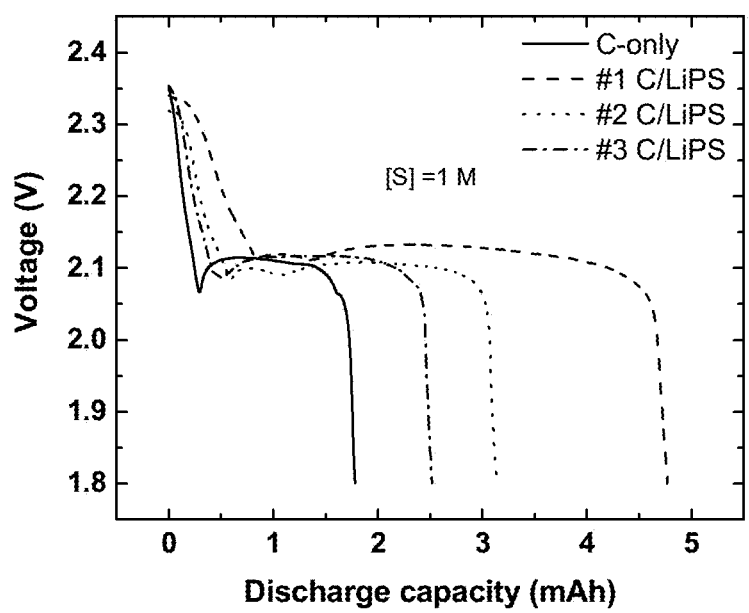
FIG. 2A and FIG. 2B show the voltage profiles of Li—S cells with $C/Li_2S_8$ cathodes and $Li_2S_8$ catholyte ([S]=1 M and [S]=5 M).
Figure 2B:
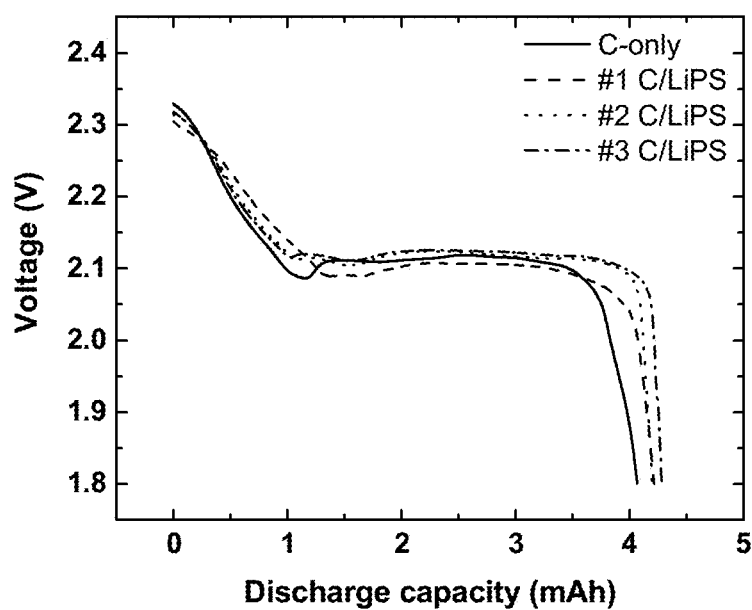

The $C/Li_2S_8$ cathodes were tested using the $Li_2S_8$ catholytes with concentrations of [S]=1 M and [S]=5 M. This approach provides an alternative way of understanding the discharge process since the entire capacity of the cell originates from the reduction of an identical LiPS species. FIG. 2 presents the voltage profiles of Li—S cells with $C/Li_2S_8$ cathodes and $Li_2S_8$ catholyte ([S]=1 M and [S]=5 M). FIG. 6 presents the discharge profiles of Li—S cells for the two catholyte concentrations. When catholyte concentration is [S]=1 M, the upper plateau capacity shows a monotonically increasing trend with increasing LiPS loading, indicating that the additional LiPS has been used. The dissolved LiPS in electrolyte is below the saturation level and, therefore, the solid LiPS is first dissolving and then undergoing the electrochemical reactions in liquid phase. Consequently, the cathode with higher LiPS loading (i.e. #1 C/LiPS) displays higher capacities for both the upper and lower plateaus. When a catholyte with a much higher concentration is used, the overall capacities show a much smaller variation from cell to cell (the maximum variation is obtained between the C-only cathode and the #3 C/Li PS and is below 0.3 mAh). The upper plateau capacities also show relatively small variations as a function of LiPS loading (below 0.3 mAh).

Although not indicated in FIG. 6, there is no capacity gain by discharging the cell down to 1.2 V. This phenomenon is due to the fact that the solid-state LiPS cannot be further dissolved in the saturated electrolyte to react in liquid phase and, at the same time, cannot be electrochemically reduced through the solid reaction pathway. The different discharge profiles under the two LiPS concentrations clearly demonstrate the effects of LiPS solubility on cell capacity. Despite the fact that there are two pathways to reduce $Li_2S_8$ (through either the LiPS-soluble liquid phase or the LiPS-insoluble solid phase), the LiPS-soluble liquid phase contributes the most to the discharge process. This can be attributed to the difference in the reaction rates of the two pathways. In general, at the discharge rates used, the reactions in the LiPS-soluble liquid phase pathway dominate the discharge process. Therefore, the cell capacity is given almost exclusively by the amount of soluble LiPS in the electrolyte, which is determined by the solubility of LiPS. Once the saturation condition is reached, the solid-state LiPS no longer contributes to cell capacity, which indicates that the $C/Li_2S_8$ cathodes with high concentration catholyte have similar capacities.

Example 3

The $C/Li_2S_4$ cathodes were made by loading CNT foam with solid-state LiPS. The selected LiPS species $Li_2S_4$ were prepared by mixing sulfur powder (Sigma-Aldrich) and Li$_2$S powder (VWR) with a molar ratio of 3:1 in a DME (Sigma-Aldrich) solution. The precursor solution was heated at 45° C. and stirred vigorously for 48 h in an argon-filled glovebox (MBraun). After 48 h the sulfur powder reacted completely with Li$_2$S to produce LiPS. The C/Li PS cathodes were obtained by adding 70 μl LiPS solution into CNT foams and then drying the soaked samples overnight to evaporate the solvent. The cathodes were tested in the same way as described in example 1 except that the electrolyte volume was varied from 50 to 70 μl.

Figure 3:
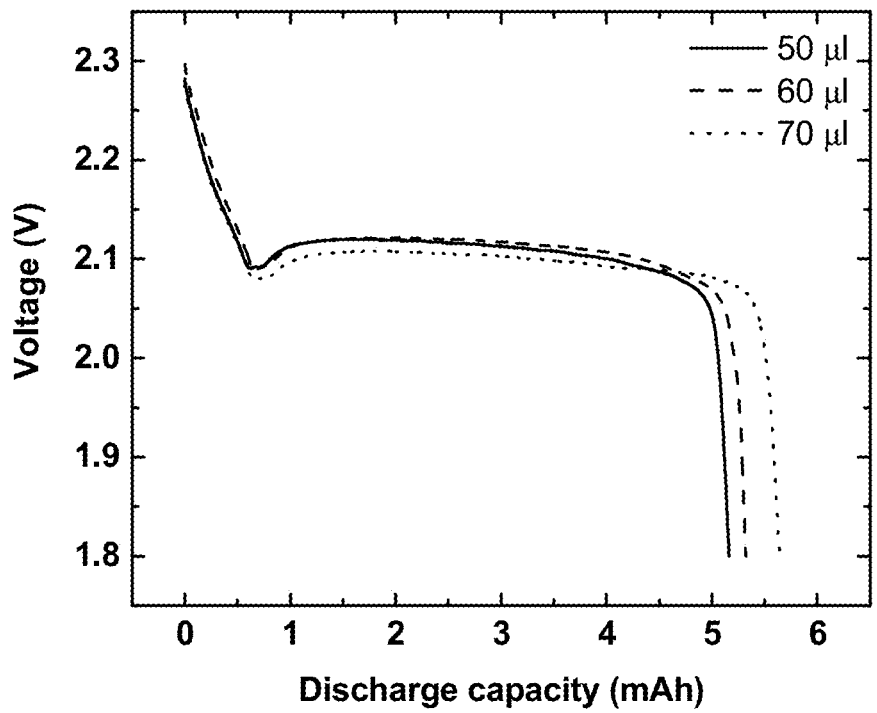
FIG. 3 shows the voltage profiles of Li—S cells with $C/Li_2S_4$ cathodes and $Li_2S_4$ catholyte ([S]=2 M).

FIG. 3 presents the voltage profiles of Li—S cells with C/Li$_2$S$_4$ cathodes and Li$_2$S$_4$ catholyte ([S]=2 M). The solubility of Li$_2$S$_4$ was determined as [S]≤2 M. Then the theoretical lower plateau capacity corresponding to the electrolyte amount of 50, 60, and 70 μl is 4.0, 4.8, and 5.6 mAh, respectively. The observed capacities are higher than these values, indicating the solubility of Li$_2$S$_4$ is not a limit in this instance and the Li—Li$_2$S$_4$ batteries can be operated beyond the solubility limit of Li$_2$S$_4$. The final discharge capacities were limited by the available surface area provided by CNT foams.

Example 4

Two materials with high nitrogen content, i.e., melamine (C$_3$H$_6$N$_6$) and dicyandiamide (C$_2$H$_4$N$_4$), are used for nitrogen doping. At specific temperatures, melamine and dicyandiamide will undergo thermal polymerization, which can serve as the precursors for nitrogen doping. Despite the high pristine nitrogen content, the low productivity of the thermal preparation limits their efficiency in nitrogen doping: at its melting point, melamine is known to vaporize or sublime rather than go through a traditional melting phase change; dicyandiamide has very close melting point and boiling point. The following methods are used for synthesizing nitrogen-doped CNT foam with melamine precursor (denoted as M-P) and dicyandiamide precursor (denoted as D-P): for M-P, CNT foam was buried in sufficient amount of melamine powder (ca. 100:1 w:w) and then heated in nitrogen at 600° C. with 80 ml min$^{-1}$ flow rate; for D-P, CNT foam was infiltrated with sufficient amount of dicyandiamide (ca. 10:1 w:w) and then heated in nitrogen at 600° C. with 80 ml min$^{-1}$ flow rate. The sample weights after the thermal treatment was almost identical with the pristine ones, indicating most the precursors were expelled during the thermal treatment. According to the XPS analysis, the nitrogen element content in the N-doping material with melamine and DICY is less than 1%, by atomic percentage.

Alternatively, in the pre-synthesis method, a nanomaterial with high nitrogen content, i.e., graphene-like C$_3$N$_4$ nanosheets (g-C$_3$N$_4$), are used as the active material for composite foam synthesis. They can be obtained by a simple thermal oxidation etching method. Then the as-obtained powders are used directly as the active material to make the CNT/C$_3$N$_4$ foam. The detailed synthesis method is described as below: the bulk g-C$_3$N$_4$ was first prepared by thermal treatment of melamine in air at 550° C., which was then placed uniformly in an open ceramic container and heated in air at 500° C. for 2 h with a ramp rate of 5° C./min. The obtained light yellow powder was mixed with CNT (3:1 w:w) and underwent the process for CNT synthesis. The difference is that polyacrylonitrile (PAN) was removed from the synthesis process and the second-step thermal treatment temperature was reduced to 500° C. in order to improve the retention rate of g-C$_3$N$_4$ in the composite foam. The nitrogen content in the cathode is estimated as about 40%, by weight.

Figure 4:
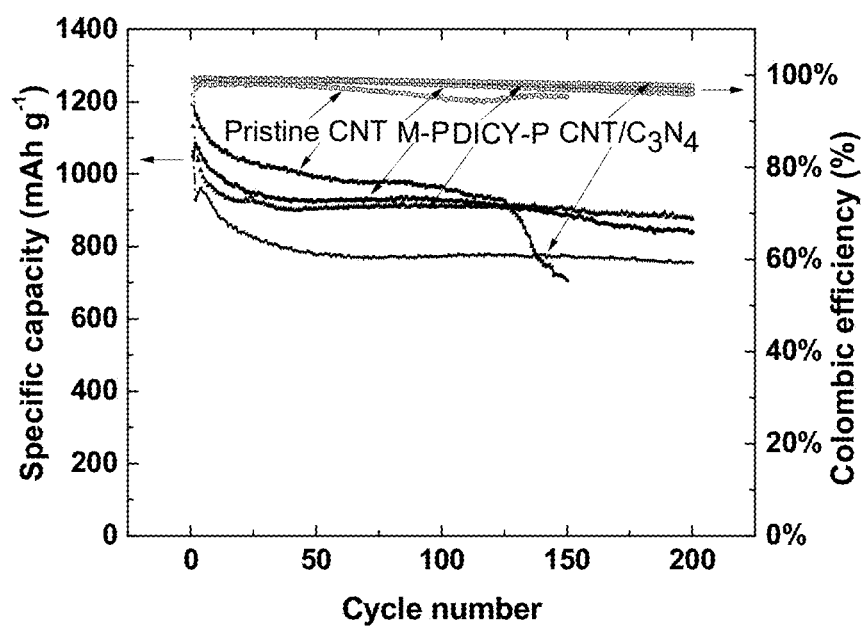
FIG. 4 shows the cycle performance of CNT cathodes with different nitrogen-dopants at 0.33 C.

The cycle performance of cathodes with different nitrogen dopants is compared with the pristine CNT cathode and the result is plotted in FIG. 4. FIG. 4 presents the cycle performance of CNT cathodes with different nitrogen-dopants at 0.33 C. It can be seen that three cathodes with nitrogen dopants all exhibit lower capacities in initial cycles but longer cycle lives and better cycle retentions. The performance of M-P and D-P are quite similar and outperform the CNT/C$_3$N$_4$ cathode. This is probably due to the fact the inclusion of large quantity of g-C$_3$N$_4$ reduces the beneficial properties, e.g., electrical conductivity and surface area, of the pristine CNT foam, which is verified by the 4-probe electrical conductivity measurement and porosimetry measurement.

Theoretical estimations of the "effective" specific capacity and specific energy of Li—S cells were made by taking into consideration the limitations imposed by the finite solubility of LiPS in the electrolyte. In these calculations, only the weight of the active electrode material, i.e., sulfur and Li metal, and the electrolyte weight are included. The electrolyte density is assumed to be equal to 1.2 g ml$^{-1}$.

Figure 5A:
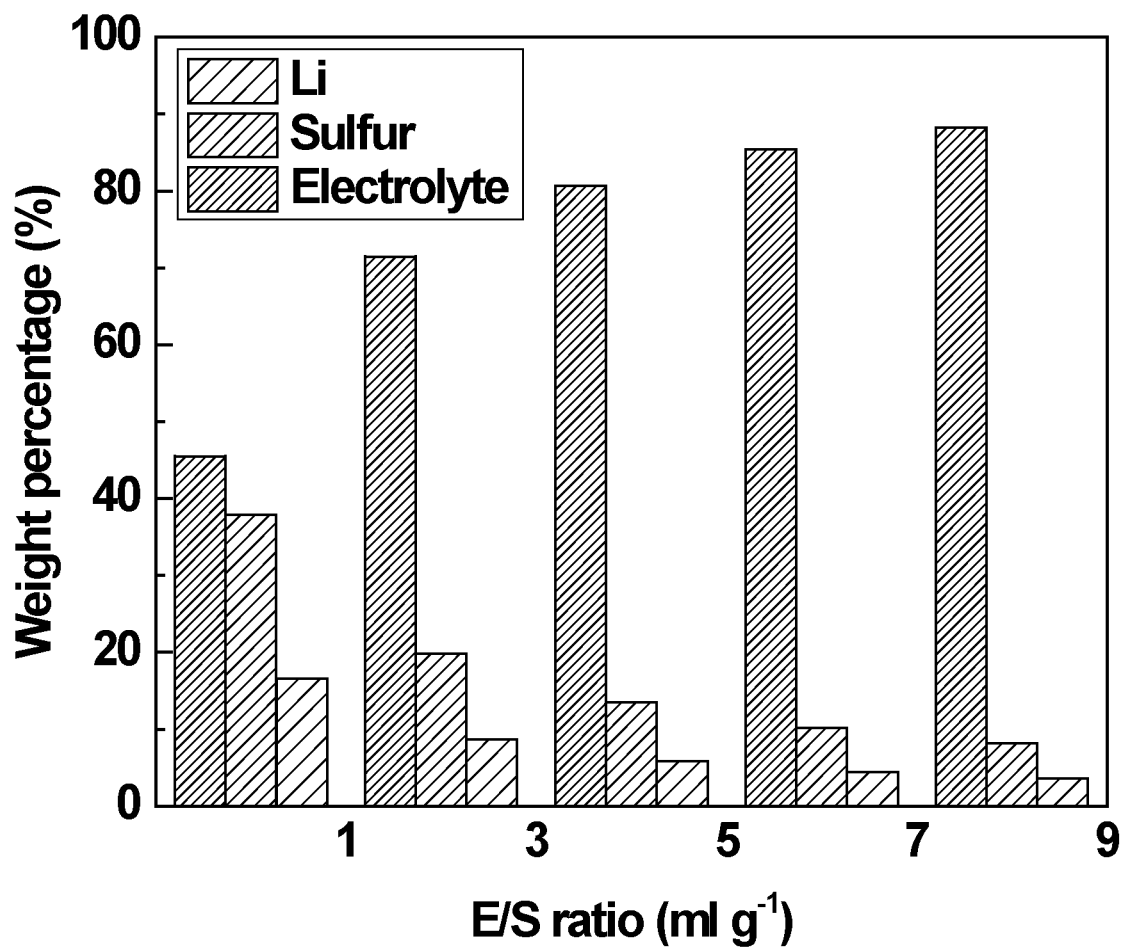
FIG. 5A shows the breakdown of the Li—S cell weight by component under different E/S ratios.
Figure 5B:
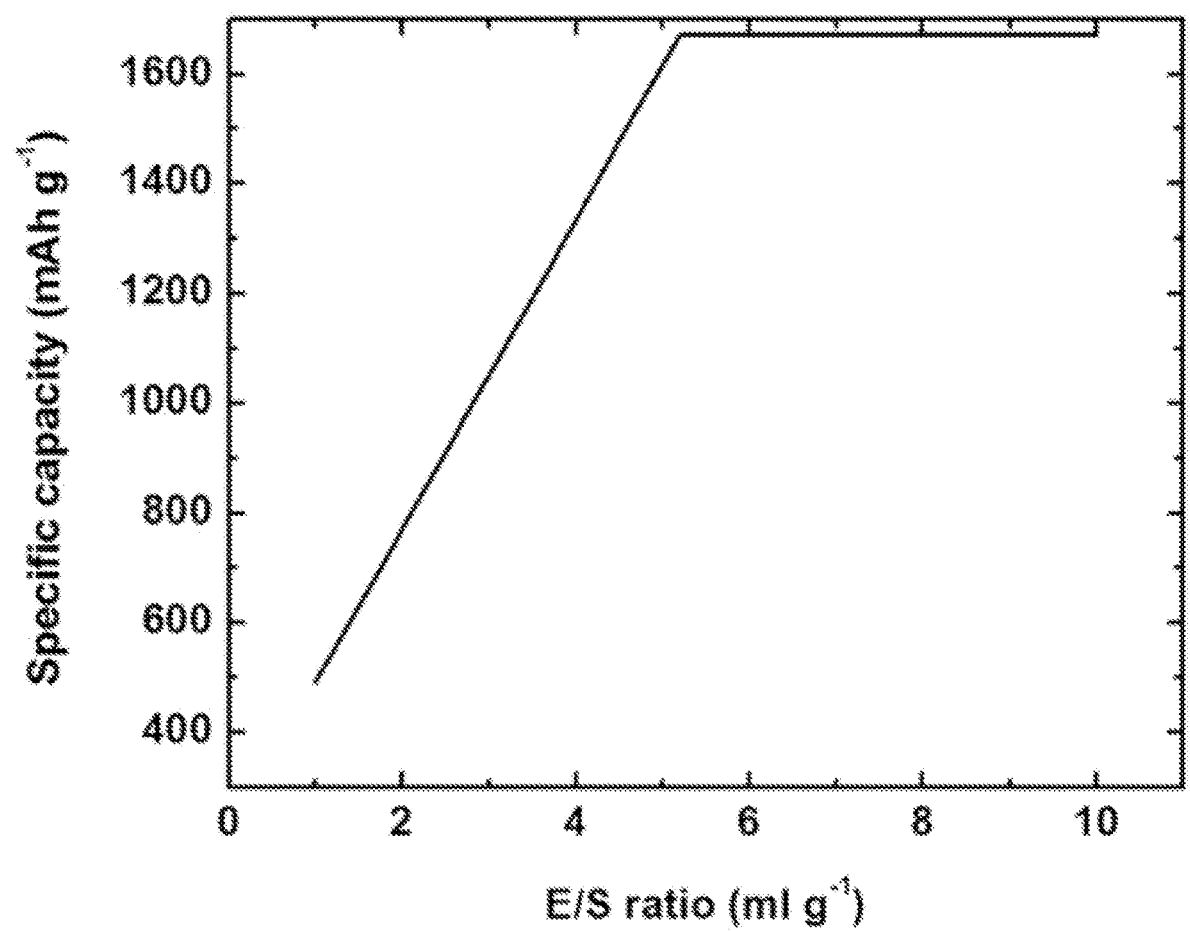
FIG. 5B shows the specific capacity of the Li—S cell as a function of the E/S ratio.
Figure 5C:
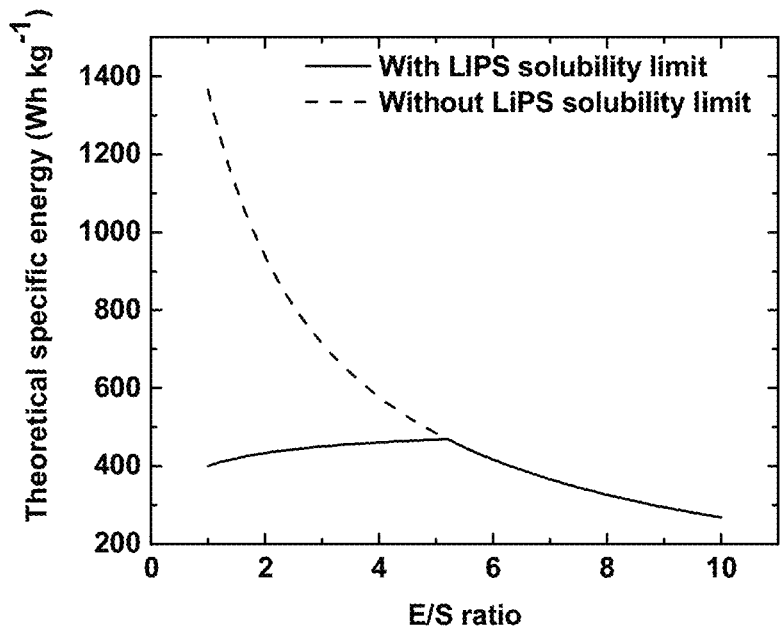
FIG. 5C shows the specific energy of the Li—S cell for different E/S ratios.
Figure 5D:
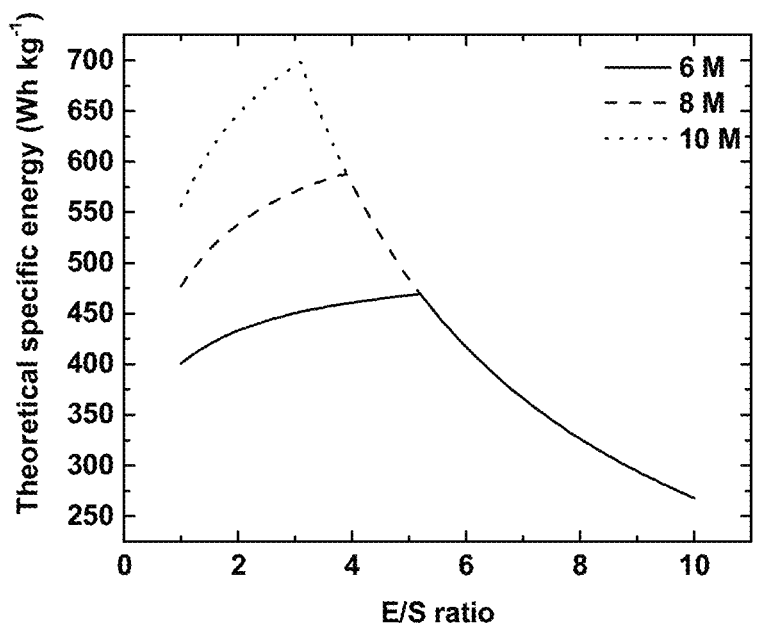
FIG. 5D shows the specific energy of the Li—S cell for different LiPS solubilities.

FIG. 5A presents the breakdown of the Li—S cell weight by component at different E/S ratios. The electrolyte accounts for most of the total weight of the Li—S cell even at relatively low E/S ratios. FIG. 5B presents the "effective" theoretical specific capacity as a function of the E/S ratio. When the E/S ratio is less than 5.2 ml g$^{-1}$, a fraction of the sulfur can be converted only to solid-state Li$_2$S$_8$, prohibiting the full utilization of the active material. The theoretical specific capacity associated with the conversion of sulfur to Li$_2$S$_8$ is 209 mAh g$^{-1}$. Therefore, as the E/S ratio decreases below 5.2 ml g$^{-1}$, a larger fraction of sulfur is reduced to Li$_2$S$_8$ in solid phase, reducing the "effective" specific capacity below its theoretical value of 1,672 mAh g$^{-1}$. FIG. 5C presents the "effective" specific energy (represented with a continuous line) and the "theoretical" specific energy (represented with dashed line) as a function of the E/S ratio. The "theoretical" specific energy was computed by neglecting the finite solubility limit of the LiPS product in the electrolyte. When the E/S ratio decreases, the total weight of the cell decreases, and the specific energy of the cell is expected to increase (see the dashed line in FIG. 5C). However, because of the finite solubility of LiPS, the "effective" specific energy actually starts to decrease slowly below E/S=5.2 ml g$^{-1}$. These results imply that reducing the E/S ratio once the LiPS solubility has been reached is redundant. To boost the specific energy of Li—S cells, electrolytes with high LiPS solubility can be used. FIG. 5D plots the specific energy of the Li—S cell as a function of the E/S ratio for different LiPS solubilities. By increasing the solubility of LiPS above 6.5 M, the E/S ratio of the cell can be decreased to 4.8 ml g$^{-1}$, and reach a specific energy of 500 Wh kg$^{-1}$.

Example 5

Figure 6A:
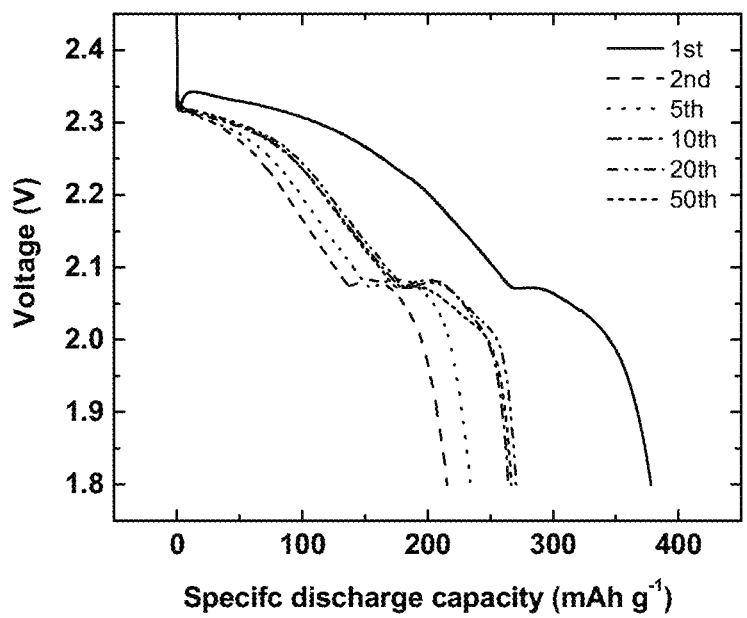
FIGS. 6A-6C show the electrochemical performance of the Li—S and Li—$Li_2S_4$ cells at a current density of 0.4 mA $cm^{-2}$.
Figure 6B:
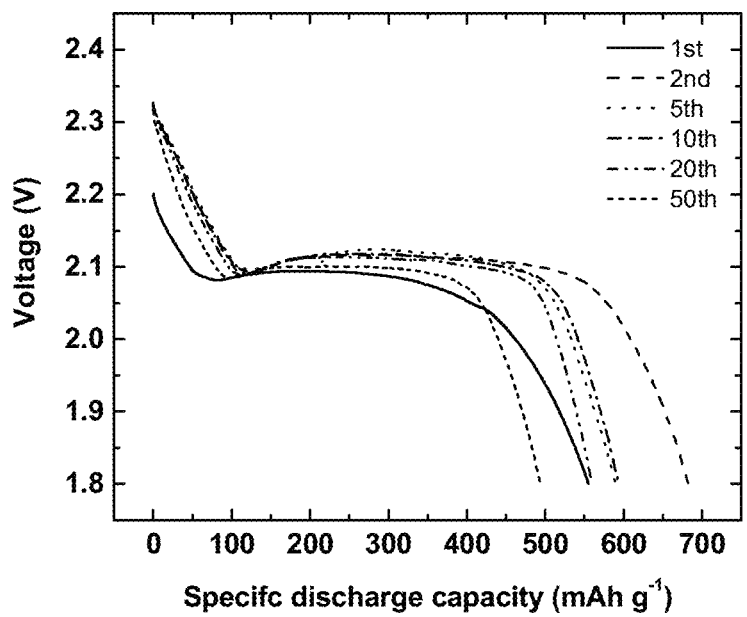
Figure 6C:
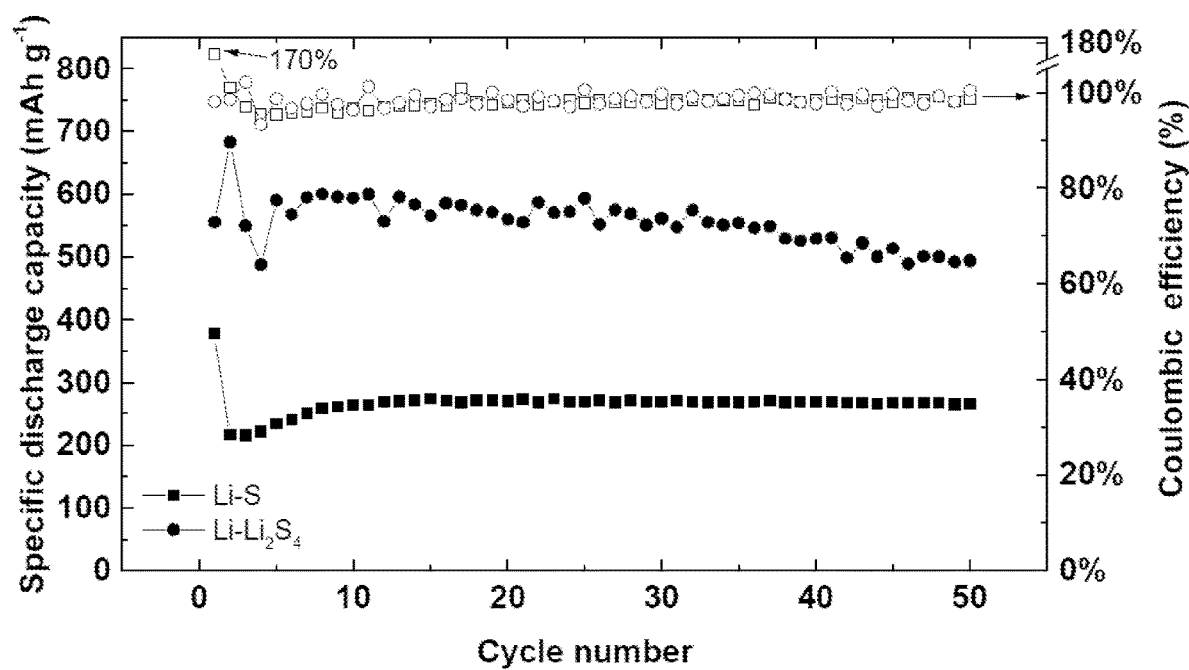

The Li—S and Li—Li$_2$S$_4$ cells with the same initial sulfur content of 84% and E/S ratio of 4.4 ml g$^{-1}$ are discharged under a current density of 0.4 mA cm$^{-2}$. The long-term cycle performance of the Li—Li$_2$S$_4$ cell is compared with that of the Li—S cell in FIG. 6. FIG. 6 presents the electrochemical performance of the Li—S and Li—Li$_2$S$_4$ cells at a current density of 0.4 mA cm$^{-2}$. FIG. 6A shows the discharge profiles of the Li—S cell in different cycles. FIG. 6B shows the discharge profiles of the Li—Li$_2$S$_4$ cell in different cycles. FIG. 6C shows the cycling performance of the Li—S and Li—Li$_2$S$_4$ cells. In order to restrict the Li—Li$_2$S$_4$ cell to cycle within the lower plateau, a lower cut-off voltage for recharge (2.35 V vs. 2.8 V) was selected. The voltage profiles of the Li—Li$_2$S$_4$ cell are compared with those of the Li—S cell in FIG. 5A-B. The obtained lower plateau capacity for Li—Li$_2$S$_4$ cell is higher than the value imposed by the solubility limitation (ca. 401.3 mAh g$^{-1}$), which again indicates that, in the case of Li—Li$_2$S$_4$ battery, the solubility of Li$_2$S$_4$ does not represent an intrinsic limitation due to the continuous dissolution of Li$_2$S$_{4(S)}$ in the electrolyte. In the following cycles, the ratio of upper plateau capacity to lower plateau capacity shows a slightly increasing trend (see FIG. 5B), which suggests that a small fraction of high-order LiPS was in fact formed at the selected cut-off voltage.

In addition to the lower initial capacity, conventional Li—S cells suffer from a significant capacity loss during the 2$^{nd}$ cycle, which reduces their rechargeable capacity drastically. The capacity loss in the Li—S cells is due to the incomplete conversion during the charge process, which is suggested by the decrease of upper plateau capacity from the 1$^{st}$ to the 2$^{nd}$ cycle in FIG. 5A and by the extremely high Coulombic efficiency of 170% during the first cycle in FIG. 5C. The Li—Li$_2$S$_4$ cell of the invention does not suffer from a significant decay of the capacity during the initial cycles since it does not involve the liquid-to-solid phase transformation at the end of charge. Instead, the Li—Li$_2$S$_4$ cells exhibit some fluctuations of the discharge capacity during the initial cycles, which can be related to the redistribution of Li$_2$S$_4$ and Li$_2$S in the conductive matrix. They maintain a stable discharge capacity during the following cycles, although a gradual capacity fade over cycles is still observable. Despite reduced LiPS dissolution, the progressive changes in the morphology of the cathode structure due to the continuous dissolution and crystallization processes as well as the gradual formation of high-order LiPS may still lead to the slow capacity decay of the cell.

Example 6

Figure 7:
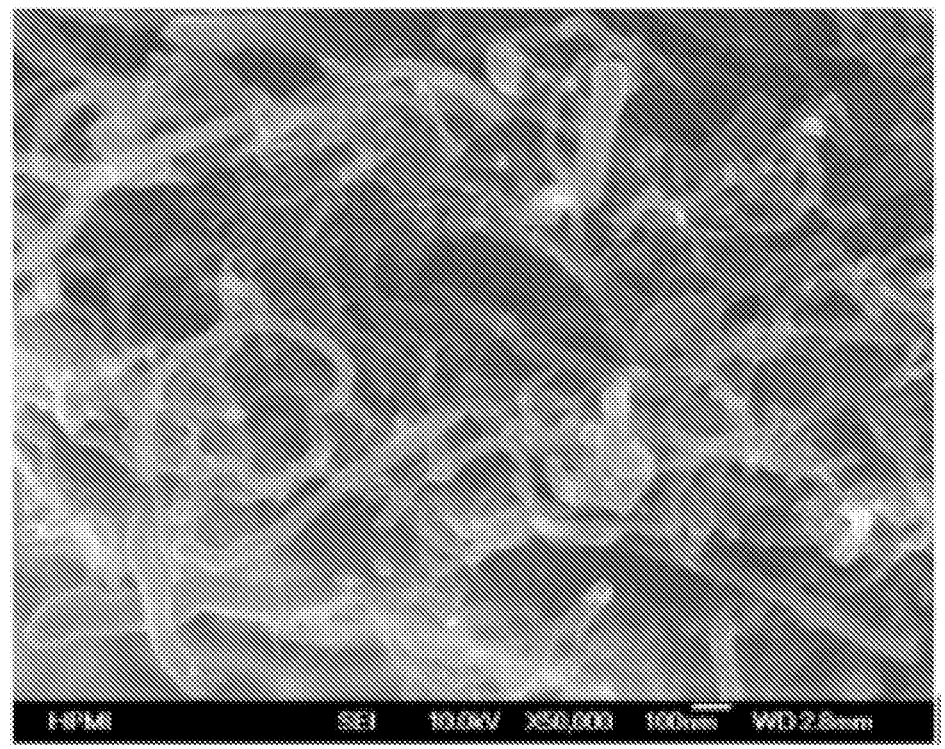
FIG. 7 shows a cross-section image of a CNT buckypaper.
Figure 8:
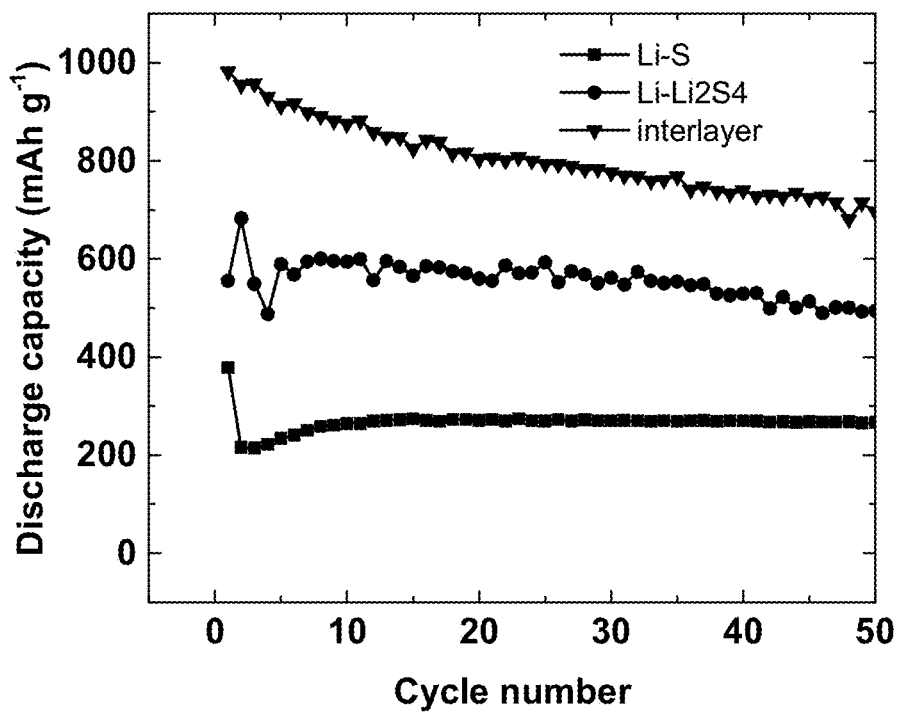
FIG. 8 shows the cycling performance of a Li—$Li_2S_4$ cell with a buckypaper interlayer in comparison with the Li—S and Li—$Li_2S_4$ cells without an interlayer.

An additional buckypaper interlayer is added between the Li$_2$S$_4$ cathode and separator, and to fully wet the electrode and interlayer, an additional 10 μl of electrolyte was added. The freestanding buckypaper interlayer is produced by vacuum filtration of isopropyl alcohol (IPA) suspension of multi-walled carbon nanotubes (MWCNT). An SEM image of a CNT buckypaper is shown in FIG. 7. FIG. 7 is a cross-sectional image of a CNT buckypaper. The cycling performance of the embodiment with an interlayer in comparison with the previous results are shown in FIG. 8. FIG. 8 presents the cycling performance of Li—Li$_2$S$_4$ cell with an buckypaper interlayer in comparison with the previous Li—S and Li—Li$_2$S$_4$ cells.

Example 7

Figure 9:
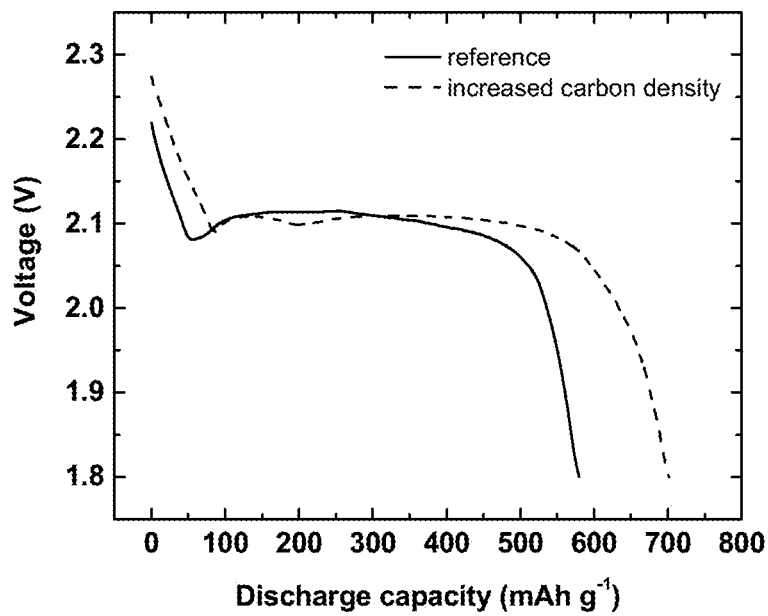
FIG. 9 shows the discharge voltage profile of a Li—$Li_2S_4$ cell with an increased carbon density in comparison with a reference cell.

A Li$_2$S$_4$ cathode with an increased carbon density (1.5*) was prepared. The cathode with an increased carbon density was obtained by increasing the weight of CNTs in making the CNT foam. FIG. 9 presents the discharge voltage profile of Li—Li$_2$S$_4$ cell with an increased carbon density in comparison with the previous result.

Example 8

Figure 10:
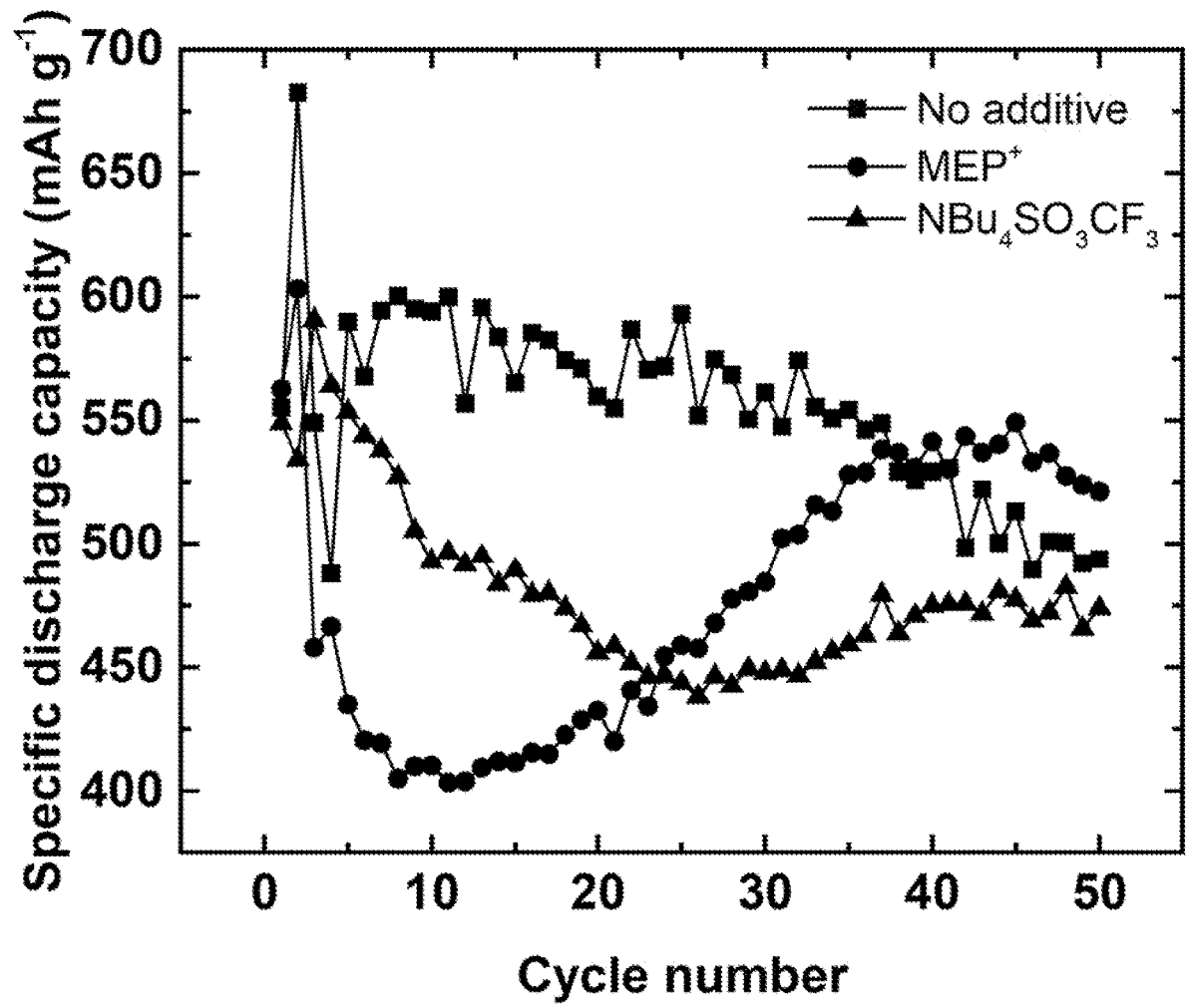
FIG. 10 shows the cycling performance of Li—S cell with $MEP^+$ and $NBu_4SO_3CF_3$ additive in comparison with a reference cell.

Two electrolyte additives, i.e., N-methyl-N-ethyl pyrrolidinium (MEP$^+$) cation and tetrabutylammonium triflate (NBu$_4$SO$_3$CF$_3$), were added to stabilize Li$_2$S$_4$ from chemical disproportionation reaction and improve the cycle performance. The cycling results are shown in FIG. 10. FIG. 10 presents the cycling performance of Li—S cell with MEP$^+$ and NBu$_4$SO$_3$CF$_3$ additive in comparison with previous result. With the additives, the cells show a higher initial decay probably due to the stabilization process. Afterwards the cells exhibit a better cycle retention.

Example 9

Figure 11:
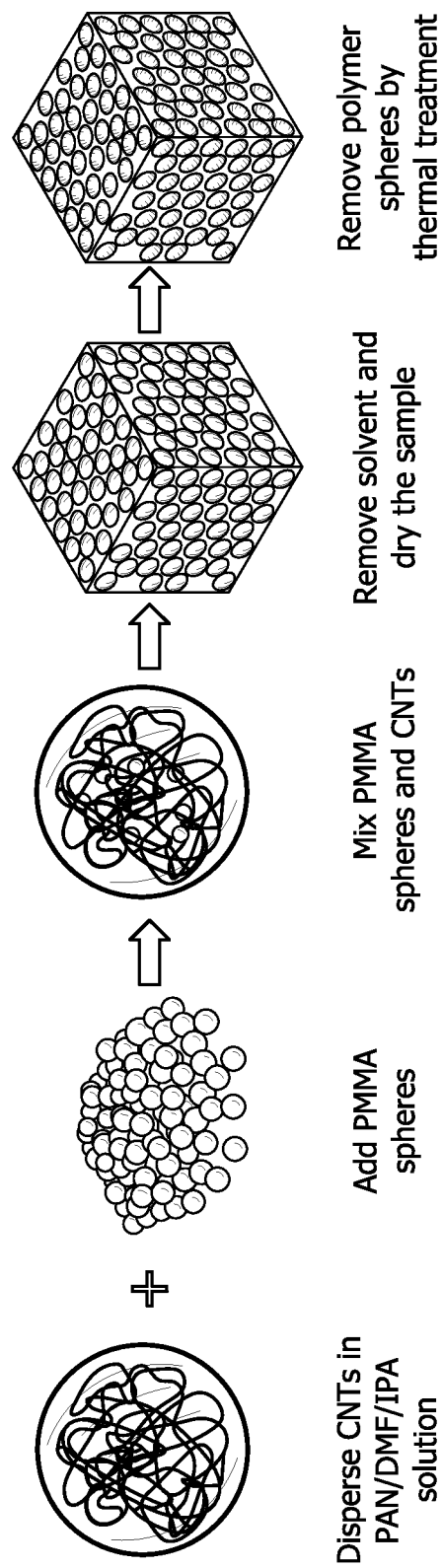
FIG. 11 shows a schematic illustration of the synthesis pathway of CNT foam.
Figure 12A:
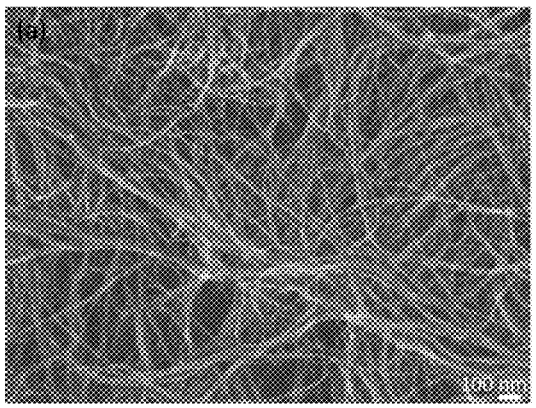
FIGS. 12A-12D show the SEM images of the CNT foam before and after $S/Li_2S_4$ infiltration.
Figure 12B:
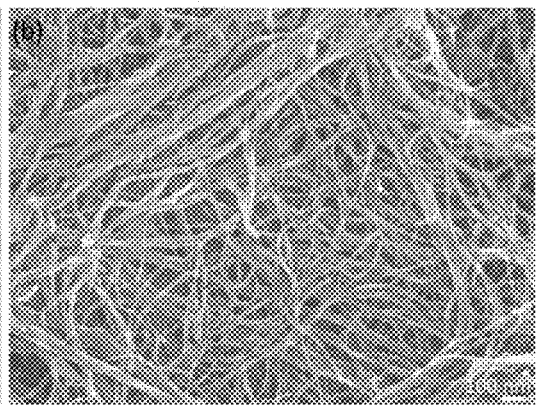
Figure 12C:
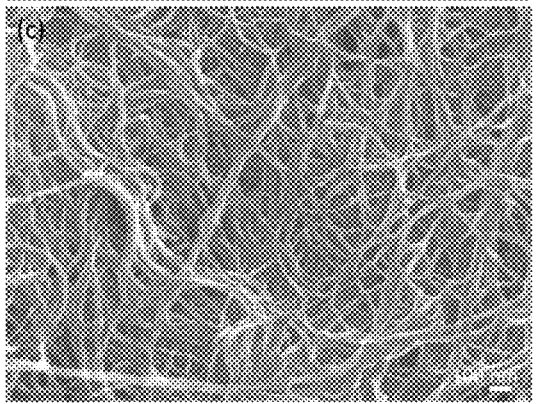
Figure 12D:
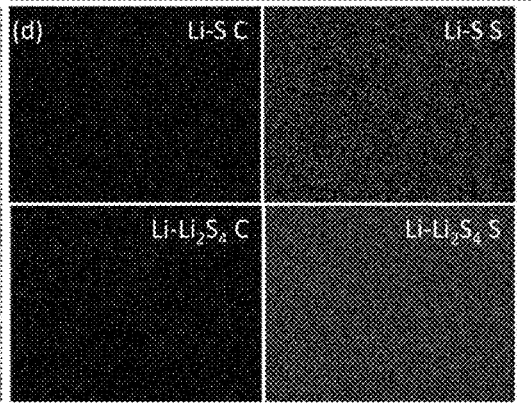

The CNT foams were fabricated based on known methods. FIG. 11 shows the synthesis pathway of the CNT foam. The MWCNTs were purchased from General Nano, LLC. PAN was dissolved in dimethylformamide (DMF) to form a PAN/DMF solution with 1 weight percent of PAN concentration. The PAN/DMF solution was added to CNTs to achieve a weight ratio of PAN-to-CNT of 0.5 and then the appropriate amount of IPA was added to obtain the CNT/PAN/IPA mixture. The mixture was well dispersed by high power sonication for 30 min. Then, poly(methyl methacrylate) (PMMA) microspheres were added to the CNT/PAN/IPA suspension and the mixture was subject to a 10-min bath sonication that helped it reach a uniform dispersion. After the sonication, the mixture was placed in a vacuum filtration system to make a CNT/PAN/PMMA solid composite, which was dried to remove the IPA and DMF completely. The CNT foams were obtained through a two-step heat treatment, first for 3 h in air at 300° C. and then for 1 h in nitrogen at 1200° C. with 80 ml min$^{-1}$ flow rate. During the first heat treatment, the PMMA microspheres were depolymerized and expelled while the PAN precursor was stabilized. In the second high-temperature treatment, the stabilized PAN precursor was carbonized to form a graphitic structure and accumulate at the joints of CNTs.

FIG. 12 presents the SEM images of the CNT foam before and after S/Li$_2$S$_4$ infiltration. FIG. 12A is SEM image of the pristine CNT foam. FIG. 12B is a SEM image of the C/S cathode. FIG. 12C is a SEM image of the C/Li$_2$S$_4$(S) cathode. FIG. 12D is EDS mapping of the SEM images shown in FIG. 12B and FIG. 12C. As seen in FIG. 12A, in the pristine CNT foam, the CNTs are randomly entangled together and the cathode has a high porosity. The morphologies of the C/S (FIG. 12B) and C/Li$_2$S$_{4(S)}$ cathode (FIG. 12C) are relatively similar to each other and the active materials are evenly distributed and form a relatively uniform coating on the surface of CNTs. The cathodes still possess a sufficient number of nanopores and mesoscale pores to allow for the electrolyte penetration during cell operation. The EDS mapping results shown in FIG. 12D indicate that sulfur is indeed distributed more or less uniformly inside the cathode.

This invention can be embodied in other forms without departing from the spirit or essential attributes thereof. Reference should also be made to the following claims in determining the scope of the invention.

We claim:
1. A lithium-sulfur battery, comprising:
a cathode electrode comprising from 80% to 100% Li$_2$S$_4$, based on the total weight of sulfur adsorbed at the cathode when the lithium-sulfur battery is fully charged, and a high specific surface area electrically conductive material having a specific surface area of between 50 m$^2$/g to 1000 m$^2$/g;
an anode electrode comprising lithium;
a porous and electrically insulating membrane between the cathode and the anode electrodes;

an electrolyte adsorbed into and between cathode electrode, the anode electrode, and the membrane, the ratio of electrolyte volume to the weight of $Li_2S_4$ being from 5 to 1 mL g$^{-1}$;

wherein the electrolyte comprises lithium salts and organic solvent, wherein the lithium salt comprises at least one selected from the group consisting of lithium bis(trifluoromethanesulfonyl)imide (LiTFSI), lithium bis(fluorosulfonyl)imide (LiFSI), lithium oxalyldifluoroborate (LiODFB), lithium bis(oxalato)borate (LiBOB), lithium fluoroalkylphosphate (LiFAP), lithium difluoro(oxalato)borate (LiDFOB), LiPF$_6$, LiBF$_4$, LiClO$_4$, LiNO$_3$, Li$_2$S$_4$, Li$_2$S$_6$, and Li$_2$S$_8$, and wherein the solvent comprises at least one selected from the group consisting of 1,3-dioxolane (DOL), 1,2-dimethoxy ethane (DME), tri(ethylene glycol) dimethyl ether (triglyme, G3), tetra(ethylene glycol) dimethyl ether (TEGDME, tetraglyme, G4), and tetrahydrofuran (THF); and, a cathode current collector and an anode current collector.

2. The lithium-sulfur battery of claim 1, wherein the weight ratio of $Li_2S_4$ and high specific surface area electrically conductive material is within a range of 1:5 to 10:1.

3. The lithium-sulfur battery of claim 1, wherein the ratio of $Li_2S_4$ in the cathode to lithium in the anode is between 3.4 to 1.7 by weight or between 1/6 to 1/12 by mole.

4. The lithium-sulfur battery of claim 1, wherein the high specific surface area electrically conductive material is at least one selected from the group consisting of carbon nanotube, graphene, activated carbon, graphite, carbon black, carbon micro bead, hard carbon, and soft carbon.

5. The lithium-sulfur battery of claim 4, wherein the high specific surface area electrically conductive material is nitrogen doped, nitrogen comprising up to 40% by weight based on the total weight of the cathode.

6. The lithium-sulfur battery of claim 1, wherein the electrical conductivity of the high specific surface/electrical conductive material is greater than 1 S/cm.

7. The lithium-sulfur battery of claim 1, wherein the cathode current collector comprises aluminum and the anode current collector comprises copper.

8. A lithium-sulfur battery, comprising:

a cathode electrode with a mixture of from 80% to 100% $Li_2S_4$ based on the total weight of sulfur adsorbed at the cathode when the lithium-sulfur battery is fully charged, and high specific surface area electrically conductive material having a specific surface area of between 50 m$^2$/g to 1000 m$^2$/g;

an anode electrode comprising lithium;

a porous and electrically insulating membrane between cathode and anode electrodes;

an electrolyte adsorbed into and between the cathode electrode, the anode electrode, and the membrane, the ratio of electrolyte volume to the weight of $Li_2S_4$ being from 5 to 1 mL g$^{-1}$;

wherein the electrolyte comprises lithium salts and organic solvent, wherein the lithium salt comprises at least one selected from the group consisting of lithium bis(trifluoromethanesulfonyl)imide (LiTFSI), lithium bis(fluorosulfonyl)imide (LiFSI), lithium oxalyldifluoroborate (LiODFB), lithium bis(oxalato)borate (LiBOB), lithium fluoroalkylphosphate (LiFAP), lithium difluoro(oxalato)borate (LiDFOB), LiPF$_6$, LiBF$_4$, LiClO$_4$, LiNO$_3$, Li$_2$S$_4$, Li$_2$S$_6$, and Li$_2$S$_8$, and wherein the solvent comprises at least one selected from the group consisting of 1,3-dioxolane (DOL), 1,2-dimethoxy ethane (DME), tri(ethylene glycol) dimethyl ether (triglyme, G3), tetra(ethylene glycol) dimethyl ether (TEGDME, tetraglyme, G$_4$), and tetrahydrofuran (THF);

a porous and electrically conductive interlayer between the membrane and at least one selected from the group consisting of the cathode electrode and the anode electrode; and, a cathode current collector and an anode current collector.

9. The lithium-sulfur battery of claim 8, wherein the ratio of $Li_2S_4$ in the cathode to lithium in the anode is between 3.4 to 1.7 by weight or between 1/6 to 1/12 by mole.

10. The lithium-sulfur battery of claim 8, wherein the ratio between $Li_2S_4$ in the cathode and lithium in the anode is between 2.8 to 1.4 by weight or 1/14 to 1/28 by mole.

11. A method of making a lithium-sulfur battery, comprising the steps of:

providing a mixture of from 80% to 100% $Li_2S_4$ based on the total weight of sulfur adsorbed at the cathode when the lithium-sulfur battery is fully charged, and a high specific surface area electrically conductive material having a specific surface area of between 50 m$^2$/g to 1000 m$^2$/g;

providing an anode electrode comprising lithium;

providing a porous and electrically insulating membrane between the cathode and the anode electrodes;

electrically connecting the cathode electrode to a cathode current collector and the anode electrode to an anode current collector; and applying an electrolyte such that the electrolyte is between and adsorbed into the cathode electrode, the anode electrode, and the membrane, the ratio of electrolyte volume to the weight of $Li_2S_4$ being from 5 to 1 mL g$^{-1}$;

wherein the electrolyte comprises lithium salts and organic solvent, wherein the lithium salt comprises at least one selected from the group consisting of lithium bis(trifluoromethanesulfonyl)imide (LiTFSI), lithium bis(fluorosulfonyl)imide (LiFSI), lithium oxalyldifluoroborate (LiODFB), lithium bis(oxalato)borate (LiBOB), lithium fluoroalkylphosphate (LiFAP), lithium difluoro(oxalato)borate (LiDFOB), LiPF$_6$, LiBF$_4$, LiClO$_4$, LiNO$_3$, Li$_2$S$_4$, Li$_2$S$_6$, and Li$_2$S$_8$, and wherein the solvent comprises at least one selected from the group consisting of 1,3-dioxolane (DOL), 1,2-dimethoxy ethane (DME), tri(ethylene glycol) dimethyl ether (triglyme, G3), tetra(ethylene glycol) dimethyl ether (TEGDME, tetraglyme, G4), and tetrahydrofuran (THF).

12. The method of claim 11, wherein the electrical conductivity of the high specific surface electrical conductive material is greater than 1 S/cm.

13. The method of claim 11, wherein the ratio between $Li_2S_4$ in the cathode and lithium in the anode is between 2.8 to 1.4 by weight or 1/14 to 1/28 by mole.

14. The method of claim 11, further comprising the step of providing a porous and electrically conductive interlayer between the membrane and at least one selected from the group consisting of the cathode electrode and the anode electrode.

* * * * *